US009163677B2

(12) United States Patent
Kawahara

(10) Patent No.: US 9,163,677 B2
(45) Date of Patent: Oct. 20, 2015

(54) TORQUE CONVERTER LOCK-UP DEVICE

(71) Applicant: EXEDY Corporation, Neyagawa-shi, Osaka (JP)

(72) Inventor: Yuki Kawahara, Osaka (JP)

(73) Assignee: EXEDY Corporation, Osaka (JP)

( * ) Notice: Subject to any disclaimer, the term of this patent is extended or adjusted under 35 U.S.C. 154(b) by 62 days.

(21) Appl. No.: 14/265,842

(22) Filed: Apr. 30, 2014

(65) Prior Publication Data

US 2014/0231204 A1   Aug. 21, 2014

Related U.S. Application Data

(63) Continuation of application No. 13/379,974, filed as application No. PCT/JP2010/063528 on Aug. 10, 2010, now Pat. No. 8,746,425.

(30) Foreign Application Priority Data

Aug. 26, 2009   (JP) ................................ 2009-195109

(51) Int. Cl.
*F16H 45/02* (2006.01)
*F16D 33/18* (2006.01)
*F16F 15/123* (2006.01)

(52) U.S. Cl.
CPC .......... *F16D 33/18* (2013.01); *F16F 15/12366* (2013.01); *F16H 45/02* (2013.01); *F16H 2045/0205* (2013.01); *F16H 2045/0226* (2013.01); *F16H 2045/0231* (2013.01); *F16H 2045/0294* (2013.01)

(58) Field of Classification Search
USPC .............. 192/3.28, 3.29, 55.61, 213.1, 213.2; 60/338; 464/68.8
See application file for complete search history.

(56) References Cited

U.S. PATENT DOCUMENTS

| 8,746,425 | B2 * | 6/2014 | Kawahara ............... F16H 45/02 192/3.29 |
| 8,857,586 | B2 * | 10/2014 | Kawahara et al. ...... F16H 45/02 192/3.29 |
| 9,011,257 | B2 * | 4/2015 | Kawahara et al. F16F 15/12366 464/68.8 |
| 2001/0052443 | A1 | 12/2001 | Tomiyama et al. |
| 2007/0131506 | A1 | 6/2007 | Wack et al. |
| 2009/0125202 | A1 | 5/2009 | Swank et al. |
| 2009/0151344 | A1 | 6/2009 | Degler et al. |

FOREIGN PATENT DOCUMENTS

| JP | 2001-082577 A | 3/2001 |
| JP | 2002-048217 A | 2/2002 |
| JP | 2007-232006 A | 9/2007 |
| JP | 2009-156270 A | 7/2009 |

* cited by examiner

*Primary Examiner* — Richard Lorence
(74) *Attorney, Agent, or Firm* — Global IP Counselors, LLP

(57) ABSTRACT

The lock-up device includes a piston, a drive plate, a plurality of radial outer side torsion springs, a float member, a driven plate, a plurality of radial inner side torsion springs and an intermediate member. The float member is rotatable relative to the drive plate and causes the radial outer side torsion springs to act in series. The intermediate member is rotatable relative to the drive plate and the driven plate, and transmits torque from the radial outer side torsion springs to the radial inner side torsion springs.

27 Claims, 2 Drawing Sheets

//TORQUE CONVERTER LOCK-UP DEVICE

CROSS-REFERENCE TO THE RELATED APPLICATIONS

This application is a continuation of U.S. patent application Ser. No. 13/379,974, filed on Dec. 21, 2011, which is a U.S. National Stage Application claiming priority under 35 U.S.C. §119(a) to Japanese Patent Application No. 2009-195109 filed on Aug. 26, 2009. The entire contents of both applications are hereby incorporated herein by reference.

TECHNICAL FIELD

The present invention relates to a lock-up device, particularly to a lock-up device disposed in a space between a front cover and a turbine in a toque converter in order to mechanically connect the front cover and the turbine.

BACKGROUND

A large number of torque converters are provided with a lock-up device for directly transmitting torque from a front cover to a turbine. The lock-up devices of this type includes a piston, a drive plate, a plurality of torsion springs and a driven plate. The piston is allowed to be frictionally coupled to the front cover. The drive plate is fixed to the piston. The torsion springs are supported by the drive plate. The driven plate is elastically coupled to the piston in a rotational direction by means of the torsion springs. Further, the driven plate is fixed to the turbine.

The piston axially divides the space between the front cover and the turbine. The piston is axially movable by means of hydraulic pressure difference between the axially divided spaces. Torque is transmitted from the front cover to the lock-up device when a friction facing, annularly attached to the radial outer part of the piston, is pressed onto the flat frictional surface of the front cover.

When torque transmission is herein executed through the lock-up device, low stiffness and a wide torsion angle are required for the torsion springs in order to eliminate or attenuate variation in torque to be inputted thereto from an engine. In response, devices have been proposed, for instance, as described in Japan Laid-open Patent Application Publication No. JP-A-2001-082577, which is an example of related art. In a device disclosed therein, torsion springs are disposed on the radial inner part and the radial outer part of the lock-up device. Further, an intermediate member couples the radial inner side torsion springs and the radial outer side torsion springs.

According to the lock-up device described in Japan Laid-open Patent Application Publication No. JP-A-2001-082577, the radial inner side torsion springs and the radial outer side torsion springs are configured to act in series through the intermediate member. Further, the radial inner side torsion springs are paired and disposed for causing each paired ones to act in series. A wide damper torsion angle is thereby produced.

However, it has been recently demanded to reduce fuel consumption by further enhancing characteristics. In response, a wider damper torsion angle is required to achieve further low stiffness.

It is an object of the present invention to provide a lock-up device with a wider damper torsion angle for achieving a damper characteristic of further low stiffness.

SUMMARY

A torque converter lock-up device according to a first aspect of the present invention is a device disposed in a space between a front cover and a turbine in a torque converter to mechanically connect the front cover and the turbine. The torque converter lock-up device includes a piston, a drive plate, first and second radial outer side elastic members, a float member, a driven plate, first and second radial inner side elastic members, and an intermediate member. The piston is selectively frictionally engageable with the front cover. The drive plate is coupled to the piston. The first and second radial outer side elastic members receive torque inputted thereto from the drive plate. The float member is rotatable relative to the drive plate. The float member causes the first and second radial outer side elastic members to act in series. The float member includes an inserted part inserted between the first and second radial outer side elastic members. The driven plate is coupled to the turbine. The first and second radial inner side elastic members are disposed radially inwards of the first and second radial outer side elastic members to transmit torque to the driven plate. The intermediate member is rotatable relative to the drive plate and the driven plate. The intermediate member transmits torque from the first and second radial outer side elastic members to the first and second radial inner side elastic members.

A torque converter lock-up device according to a second aspect of the present invention is a device disposed in a space between a front cover and a turbine in a torque converter to mechanically connect the front cover and the turbine. The torque converter lock-up device includes a piston, a drive plate, first and second radial outer side elastic members, a float member, a driven plate, first and second radial inner side elastic members, and an intermediate member. The piston is selectively frictionally engageable with the front cover. The drive plate is coupled to the piston. The first and second radial outer side elastic members receive torque inputted thereto from the drive plate. The float member is rotatable relative to the drive plate and the intermediate member. The float member causes the first and second radial outer side elastic members to act in series. The driven plate is coupled to the turbine. The first and second radial inner side elastic members are disposed radially inwards of the first and second radial outer side elastic members to transmit torque to the driven plate. The intermediate member is rotatable relative to the drive plate and the driven plate. The intermediate member transmits torque from the first and second radial outer side elastic members to the first and second radial inner side elastic members.

According to the torque converter lock-up device of aspects of the present invention, engine torque is transmitted from the front cover to the piston and is further transmitted to the drive plate when the piston is coupled to the front cover. The torque transmitted to the drive plate is transmitted from the radial outer side elastic members to the radial inner side elastic members through the intermediate member and is further transmitted to the turbine through the driven plate.

Further, the radial outer side elastic members and the radial inner side elastic members act in series through the intermediate member. The elastic members are configured to act in series on the radial outer side where a longer circumferential distance can be produced. Therefore, a wider damper torsion angle can be produced, and further low stiffness can be thereby achieved.

ADVANTAGEOUS EFFECTS OF THE INVENTION

Overall, according to the aforementioned aspects of exemplary embodiments of the present invention, a wider damper torsion angle can be produced in the lock-up device, and a damper characteristic of further low stiffness can be thereby achieved.

DETAILED DESCRIPTION OF EXEMPLARY EMBODIMENTS

Figure 1:
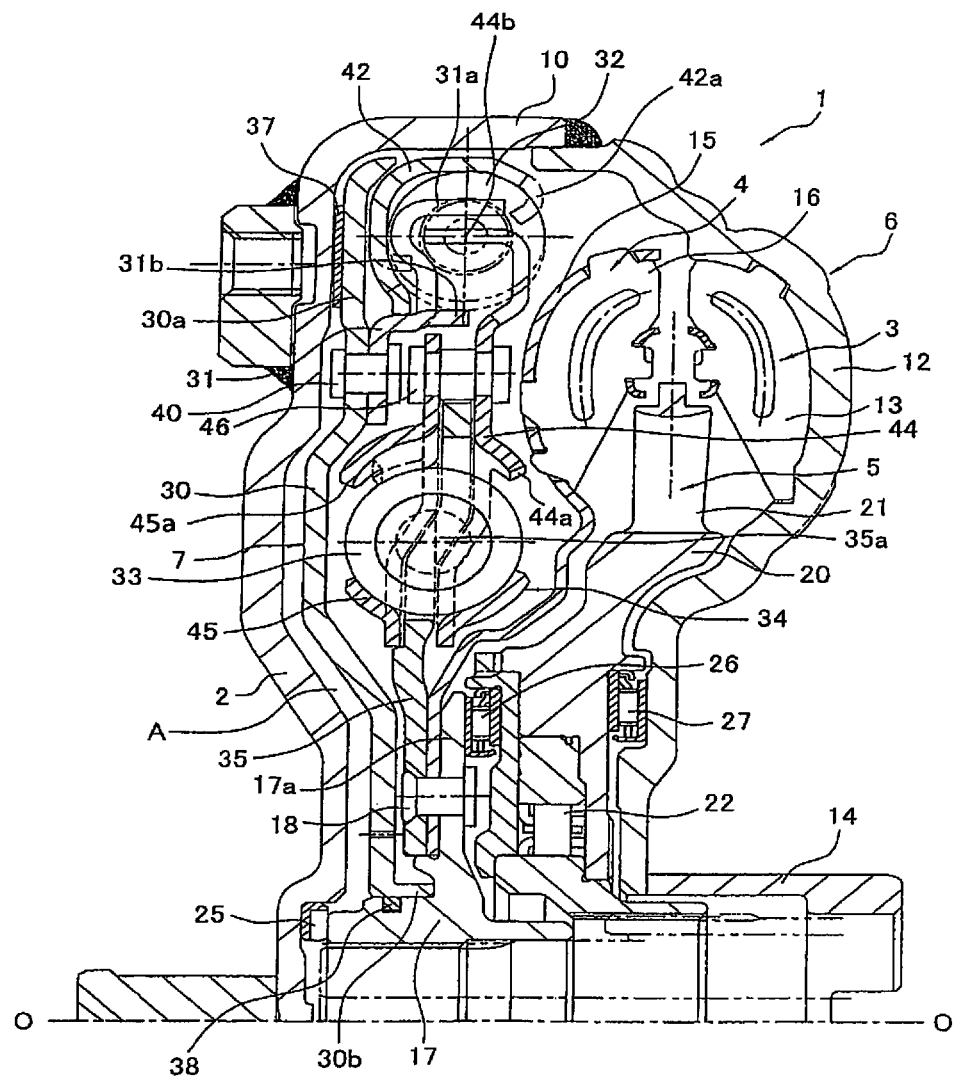
FIG. 1 is a partial cross-sectional view of a torque converter embedded with a lock-up device according to an exemplary embodiment of the present invention.
Figure 2:
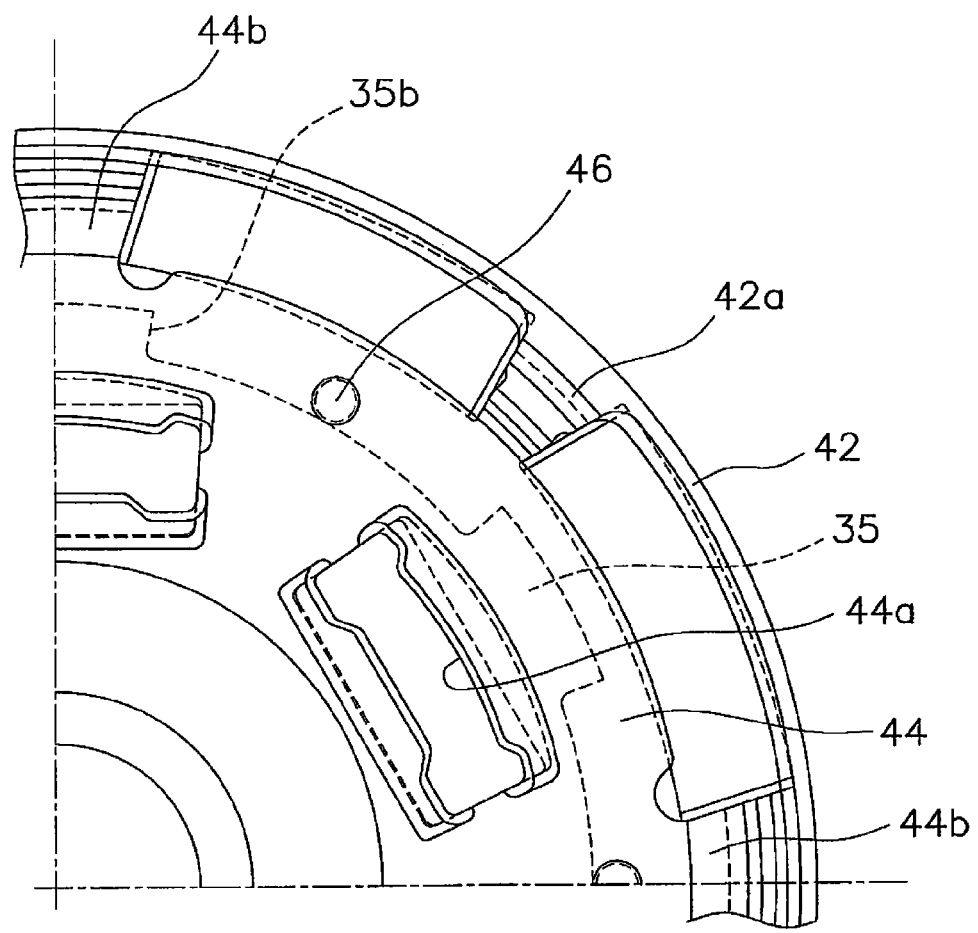
FIG. 2 is a partial front view of the lock-up device.

FIG. 1 is a partial cross-sectional view of a torque converter 1 employing a lock-up device according to an exemplary embodiment of the present invention. In FIG. 1, an engine (not illustrated in the figure) is disposed on the left side, while a transmission (not illustrated in the figure) is disposed on the right side. FIG. 2 is a partial front view of the lock-up device. FIG. 2 omits illustration of torsion springs used as elastic members. It should be noted that FIG. 1 illustrates a line O-O as a rotational axis shared by the torque converter and the lock-up device.

Entire Structure of Torque Converter

The torque converter 1 is a device configured to transmit torque from an engine side crankshaft (not illustrated in the figures) to a transmission side input shaft. The torque converter 1 includes a front cover 2, a torque converter main body 6 and a lock-up device 7. The front cover 2 is fixed to input side members. The torque converter main body 6 is formed by three types of vanes (i.e., an impeller 3, a turbine 4 and a stator 5).

The front cover 2 is a disc member and includes an outer peripheral tubular portion 10 on the outer periphery thereof. The outer periphery tubular portion 10 is axially protruded towards the transmission. The impeller 3 includes an impeller shell 12, a plurality of impeller blades 13 and a tubular impeller hub 14. The impeller shell 12 is fixed to the outer peripheral tubular portion 10 of the front cover 2 by means of welding. The impeller blades 13 are fixed to the inside of the impeller shell 12. The tubular impeller hub 14 is disposed on the inner peripheral part of the impeller shell 12. The turbine 4 is faced to the impeller 3 within a fluid chamber. The turbine 4 includes a turbine shell 15, a plurality of turbine blades 16 and a turbine hub 17. The turbine blades 16 are fixed to the turbine shell 15. The turbine hub 17 is fixed to the inner peripheral part of the turbine shell 15. The turbine hub 17 includes a flange 17a extended radial outwards. The inner peripheral part of the turbine shell 15 is fixed to the flange 17a by means of a plurality of rivets 18. Further, the transmission side input shaft (not illustrated in the figures) is fitted into the inner periphery of the turbine hub 17 by means of spline engagement.

The stator 5 is a mechanism disposed between the inner periphery of the impeller 3 and the inner periphery of the turbine 4 in order to regulate the flow of the operating oil returning from the turbine 4 to the impeller 3. The stator 5 mainly includes a disc stator carrier 20 and a plurality of stator blades 21 disposed on the outer peripheral surface of the disc stator carrier 20. The stator carrier 20 is supported by a stationary shaft (not illustrated in the figures) through a one-way clutch 22. It should be noted that a thrust washer 25 is disposed axially between the front cover 2 and the turbine hub 17. Further, a thrust bearing 26 is disposed between the turbine hub 17 and the stator carrier 20, while a thrust bearing 27 is disposed between the stator carrier 20 and the impeller shell 12.

Lock-Up Device

The lock-up device 7 is disposed in an annular space between the front cover 2 and the turbine 4. The lock-up device 7 mainly includes a piston 30, a drive plate 31, a plurality of radial outer side torsion springs 32, a plurality of radial inner side torsion springs 33, an intermediate member 34 coupling the radial outer side torsion springs 32 and the radial inner side torsion springs 33, and a driven plate 35.

Piston

The piston 30 is a disc plate member disposed for axially dividing a space between the front cover 2 and the turbine 4 into two subspaces. The piston 30 includes a flat friction coupling portion 30a on the radial outer part thereof. A friction facing 37 is disposed on the axial engine side surface of the friction coupling portion 30a. The front cover 2 includes a flat friction surface opposed to the friction facing 37. Further, the piston 30 includes an inner peripheral tubular portion 30b on the inner peripheral edge thereof. The inner peripheral tubular portion 30b is axially extended towards the transmission. The inner peripheral surface of the inner peripheral tubular portion 30b is supported by and movable along the outer peripheral surface of the turbine hub 17 in both axial and rotational directions. It should be noted that the piston 30 is prevented from axially moving towards the transmission from the position where the tip of the inner peripheral tubular portion 30b makes contact with a part of the turbine hub 17. A sealing ring 38 is disposed between the inner peripheral tubular portion 30b and the outer peripheral surface of the turbine hub 17.

With the structure, a space A is produced between the front cover 2 and the piston 30. The radial outer part of the space A is blocked while the friction facing 37 makes contact with the front cover 2. On the other hand, the radial inner part of the space A communicates with an oil path formed in the input shaft through a groove formed on the thrust washer 25.

Drive Plate

The drive plate 31 is an annular member made of sheet metal. The drive plate 31 is disposed on the axial transmission side surface of the friction coupling portion 30a of the piston 30. The radial inner part of the drive plate 31 is fixed to the piston 30 by means of a plurality of rivets 40. Further, the drive plate 31 includes a plurality of locking portions 31a on the outer periphery thereof. The locking portions 31a are axially extended towards the transmission. The locking portions 31a are circumferentially disposed at predetermined intervals. The locking portions 31a support the circumferential ends (i.e., the axial ends) of the radial outer side torsion springs 32. Further, the drive plate 31 includes a support portion 31b above the piston attached portion thereof of FIG. 1. The support portion 31b is axially extended towards the transmission. The support portion 31b supports the radial inner side surfaces of the radial outer side torsion springs 32.

Radial Outer Side Torsion Springs

Each radial outer side torsion spring 32 is formed by the combination of a large coil spring and a small coil spring inserted into the large coil spring. The length of the small coil spring is shorter than that of the large coil spring. Totally eight radial outer side torsion springs 32 are herein paired and disposed. Further, a float member 42 is disposed for causing two radial outer side torsion springs 32 in each pair to act in series. The float member 42 is an annular member having a C-shaped cross-section. The float member 42 is disposed above the support portion 31b of the drive plate 31, as shown in FIG. 1. The float member 42 is disposed relatively rotatable to the drive plate 31. The outer periphery of the float member 42 supports the outer peripheries of the radial outer side torsion springs 32. In other words, the float member 42 prevents the radial outer side torsion springs 32 from radial-outwardly jumping out. The float member 42 includes a bent portion 42a on the axial transmission side tip thereof. The bent portion 42a is bent towards the inner periphery of the float member 42 and further towards the engine. The bent portion 42a is inserted between a pair of the radial outer side torsion springs 32. In other words, the both circumferential edges of the bent portion 42a are abutted to the corresponding circumferential ends of the paired radial outer side torsion springs 32.

As described above, in a pair of the plural pairs of the radial outer side torsion springs 32, the paired radial outer side torsion springs 32 are supported by the locking portions 31a of the drive plate 31 at the both circumferential ends thereof, while interposing the bent portion 42a of the float member 42 therebetween. Further, the outer peripheries of the radial outer side torsion springs 32 are supported by the outer periphery of the float member 42.

Intermediate Member

The intermediate member 34 is an annular disc plate member disposed between the piston 30 and the turbine shell 15. The intermediate member 34 includes a first plate 44 and a second plate 45. The first and second plates 44 and 45 are axially disposed away from each other. Specifically, the first plate 44 is disposed on the axial transmission side, while the second plate 45 is disposed on the axial engine side. The first and second plates 44 and 45 are coupled at radial outer parts thereof by means of a plurality of stopper pins 46, while being non-rotatable relative to each other and axially immovable. The first plate 44 includes axially penetrating windows 44a, while the second plate 45 includes axially penetrating windows 45a. As is obvious from FIG. 2, each of the windows 44a and 45a is circumferentially extended and includes a pair of cut-and-bent portions axially cut and bent on the radial inner and outer parts thereof.

Further, the first plate 44 includes a plurality of engaging portions 44b on the outer peripheral edge thereof. The engaging portions 44b are extended to the radial outer side torsion springs 32. The engaging portions 44b are formed by axially bending the tip of the first plate 44 towards the engine. The engaging portions 44b are circumferentially disposed at predetermined intervals. Given two adjacent engaging portions 44b interpose therebetween a pair of the radial outer side torsion springs 32 configured to act in series.

Radial Inner Side Torsion Springs

Each radial inner side torsion spring 33 is formed by the combination of a large coil spring and a small coil spring inserted into the large coil spring. The length of the small coil spring is the same as that of the large coil spring. Each radial inner side torsion spring 33 is disposed within a pair of the windows 44a and 45a of the first and second plates 44 and 45 forming the intermediate member 34. Each pair of the windows 44a and 45a supports the both circumferential ends of and the both radial sides of each radial inner side torsion spring 33. Further, the cut-and-bent portions of each pair of windows 44 and 45 prevents each radial inner side torsion spring 33 from axially jumping out.

Driven Plate

The driven plate 35 is an annular disc member and the radial inner part thereof is fixed together with the turbine shell 15 to the flange 17a of the turbine hub 17 by means of the rivets 18. The driven plate 35 is disposed between the first plate 44 and the second plate 45 while being rotatable relative to both of the first and second plates 44 and 45. Further, the driven plate 35 includes window apertures 35a on the radial outer part thereof. Positions of the window apertures 35a are matched with those of the plural pairs of the windows 44a and 45a of the first and second plates 44 and 45. Each window aperture 35a is an axially penetrating aperture in which each radial inner side torsion spring 33 is disposed. As depicted with a broken line in FIG. 2, the driven plate 35 further includes a plurality of circumferentially elongated notches 35b on the outer periphery thereof. Each stopper pin 46 axially penetrates each notch 35b. Therefore, the driven plate 35 and the first and second plates 44 and 45 forming the intermediate member 34 are rotatable relative to each other within an angular range corresponding to the circumferential range of each notch 35b.

Actions

Next, actions of the torque converter 1 will be explained. Torque is inputted into the front cover 2 from the engine side crankshaft. The impeller 3 is thereby rotated and the operating oil flows from the impeller 3 towards the turbine 4. The turbine 4 is rotated by means of the flow of the operating oil, and torque of the turbine 4 is outputted to the input shaft (not illustrated in the figures).

The operating oil in the space A is drained through the oil path formed in the input shaft when the speed ratio of the torque converter 1 is increased and the rotation speed of the input shaft becomes constant. The piston 30 is accordingly moved towards the front cover 2. Consequently, the friction facing 37 of the piston 30 is pressed onto the friction surface of the front cover 2, and torque of the front cover 2 is outputted to the lock-up device 7.

In the lock-up device 7, torque is sequentially transmitted to the piston 30, the drive plate 31, the radial outer side torsion springs 32, the intermediate member 34, the radial inner side torsion springs 33 and the driven plate 35 in this order, and is finally outputted to the turbine hub 17.

In the lock-up device 7, torque is thus transmitted, and simultaneously, variation in torque inputted thereto from the front cover 2 is eliminated or attenuated. Specifically, when torsional vibration is produced in the lock-up device 7, the radial outer side torsion springs 32 and the radial inner side torsion springs 33 are compressed in series between the drive plate 31 and the driven plate 35. Further, in a pair of the plural pairs of the radial outer side torsion springs 32, the paired radial outer side torsion springs 32 are compressed in series. Therefore, the torsion angle can be increased. In addition, the radial outer side torsion springs 32 are configured to act in series particularly in positions where a long circumferential distance can be produced for each radial outer side torsion spring 32. Therefore, a wider torsion angle can be ensured. In other words, a torsional characteristic of low stiffness can be achieved and vibration eliminating/attenuating performance can be further enhanced.

It should be noted that only the large coil spring of each radial outer side torsion spring 32 and the large and small coil springs of each radial inner side torsion spring 33 are configured to act until each stopper pin 46 is abutted to an edge of the corresponding one of the notches 35b formed in the driven plate 35. Further, the large and small coil springs of each radial outer side torsion spring 32 are configured to act (i.e., the radial inner side torsion springs 33 are herein configured not to act) after each stopper pin 46 is abutted to the edge of the corresponding notch 35b. Simply put, the lock-up device 7 has a two-staged torsional characteristic.

The radial outer side torsion springs 32 are normally moved radial outwards by means of centrifugal force. Therefore, a member is required for preventing radial outward movement of the radial outer side torsion springs 32. In the present exemplary embodiment, radial outward movement of the radial outer side torsion springs 32 is prevented by the float member 42 supporting the outer peripheries of the radial outer side torsion springs 32. The float member 42 is herein configured to be moved together with the radial outer side torsion springs 32. Therefore, it is possible to reduce resistance in slide contact, compared to the well-known devices having the structure that the drive plate supports the outer peripheries of the radial outer side torsion springs.

Further in the present exemplary embodiment, the radial outer side torsion springs 32 and the radial inner side torsion springs 33 are coupled by the intermediate member 34. Therefore, entire hysteresis torque is produced by combining inner peripheral side hysteresis torque and outer peripheral side hysteresis torque. Therefore, in the structure of the present exemplary embodiment, hysteresis torque of the radial outer side torsion springs is less than that of the well-known structure in the above publication (JP-A-2001-082577), while hysteresis torque of the radial inner side torsion springs is the same as that of the well-known structure in the above publication. In other words, entire hysteresis torque in the structure of the present exemplary embodiment is less than that of the well-known structure of the above publication. It is consequently possible to enhance vibration eliminating/attenuating performance and achieve low fuel consumption by expanding the lock-up range.

Other Exemplary Embodiments

The present invention is not limited to the aforementioned exemplary embodiment. A variety of changes or modifications can be herein made without departing from the scope of the present invention.

For example, the coil springs are used as the elastic members in the present exemplary embodiment. However, any other elastic members made of resin or the like may be used as the elastic members.

Further, the configurations (e.g., number and length) of coil springs used as the radial outer side torsion springs and the radial inner side torsion springs are not limited to those of the aforementioned exemplary embodiment.

INDUSTRIAL APPLICABILITY

According to the present invention, a wider damper torsion angle can be produced in a lock-up device and a damper characteristic of further low stiffness can be thereby achieved.

What is claimed is:

1. A torque converter lock-up device disposed in a space between a front cover and a turbine in a torque converter to mechanically connect the front cover and the turbine, the torque converter lock-up device comprising:
a piston configured to selectively frictionally engage the front cover;
a drive plate coupled to the piston;
first and second radial outer side elastic members configured to receive torque from the drive plate;
a float member configured to rotate relative to the drive plate, the float member configured to cause the first and second radial outer side elastic members to act in series, and including an inserted part being inserted between the first radial outer side elastic member and the second radial outer side elastic member;
a driven plate coupled to the turbine;
first and second radial inner side elastic members disposed inwardly in a radial direction of the first and second radial outer side elastic members to transmit the torque to the driven plate; and
an intermediate member configured to rotate relative to the drive plate and the driven plate, the intermediate member configured to transmit the torque from the first and second radial outer side elastic members to the first and second radial inner side elastic members.

2. The torque converter lock-up device according to claim 1, wherein
the drive plate includes a support portion axially extending towards the transmission, the support portion supporting the radial inner side surfaces of the radial outer side elastic members.

3. The torque converter lock-up device according to claim 2, wherein
the float member is an annular member and is disposed outwardly in a radial direction of the support portion.

4. The torque converter lock-up device according to claim 1, wherein
the float member includes a covering part covering outer peripheries of the radial outer side elastic members.

5. The torque converter lock-up device according to claim 4, wherein
the intermediate member includes a plurality of engaging portions extending to the radial outer side elastic members.

6. The torque converter lock-up device according to claim 5, wherein
the engaging portions are disposed inwardly in a radial direction of the covering part of the float member.

7. The torque converter lock-up device according to claim 1, wherein
the intermediate member includes a first plate and a second plate, the first and second plates being axially disposed away from each other.

8. The torque converter lock-up device according to claim 7, wherein
the first plate includes a plurality of engaging portions and a plurality of first windows.

9. The torque converter lock-up device according to claim 8, wherein
the engaging portions are provided on the outer peripheral edge of the first plate and extend to the radial outer side elastic members.

10. The torque converter lock-up device according to claim 9, wherein
the plurality of first windows are provided inwardly in a radial direction of the engaging portions.

11. The torque converter lock-up device according to claim 10, wherein
the second plate includes a plurality of second windows.

12. The torque converter lock-up device according to claim 11, wherein
the radial inner side elastic members are disposed within the pluralities of first and second windows.

13. The torque converter lock-up device according to claim 1, wherein
the intermediate member is rotatable relative to the turbine.

14. A torque converter lock-up device disposed in a space between a front cover and a turbine in a torque converter to mechanically connect the front cover and the turbine, the torque converter lock-up device comprising:
a piston configured to selectively frictionally engage the front cover;
a drive plate coupled to the piston;

first and second radial outer side elastic members configured to receive torque from the drive plate;
a driven plate coupled to the turbine;
first and second radial inner side elastic members disposed inwardly in a radial direction of the first and second radial outer side elastic members to transmit the torque to the driven plate;
an intermediate member configured to rotate relative to the drive plate and the driven plate, the intermediate member configured to transmit the torque from the first and second radial outer side elastic members to the first and second radial inner side elastic members; and
a float member configured to rotate relative to the drive plate and the intermediate member, the float member configured to cause the first and second radial outer side elastic members to act in series.

15. The torque converter lock-up device according to claim 14, wherein
the float member includes an inserted part inserted between the first radial outer side elastic member and the second radial outer side elastic member.

16. The torque converter lock-up device recited in claim 14, wherein
the drive plate includes a support portion axially extending towards the transmission, the support portion supporting the radial inner side surfaces of the radial outer side elastic members.

17. The torque converter lock-up device recited in claim 16, wherein
the float member is an annular member and is disposed outwardly in a radial direction of the support portion.

18. The torque converter lock-up device recited in claim 17, wherein
the float member includes a covering part covering outer peripheries of the radial outer side elastic members.

19. The torque converter lock-up device according to claim 18, wherein
the intermediate member includes a plurality of engaging portions extending to the radial outer side elastic members.

20. The torque converter lock-up device according to claim 19, wherein
the engaging portions are disposed inwardly in a radial direction of the covering part of the float member.

21. The torque converter lock-up device according to claim 20, wherein
the intermediate member includes a first plate and a second plate, the first and second plates being axially disposed away from each other.

22. The torque converter lock-up device according to claim 21, wherein
the first plate includes a plurality of engaging portions and a plurality of first windows.

23. The torque converter lock-up device according to claim 22, wherein
the engaging portions are provided on the outer peripheral edge of the first plate and extend to the radial outer side elastic members.

24. The torque converter lock-up device according to claim 23, wherein
the plurality of first windows are provided inwardly in a radial direction of the engaging portions.

25. The torque converter lock-up device according to claim 24, wherein
the second plate includes a plurality of second windows.

26. The torque converter lock-up device according to claim 25, wherein
the radial inner side elastic members are disposed within the pluralities of first and second windows.

27. The torque converter lock-up device according to claim 26, wherein
the intermediate member is rotatable relative to the turbine.

* * * * *